Figure 1:
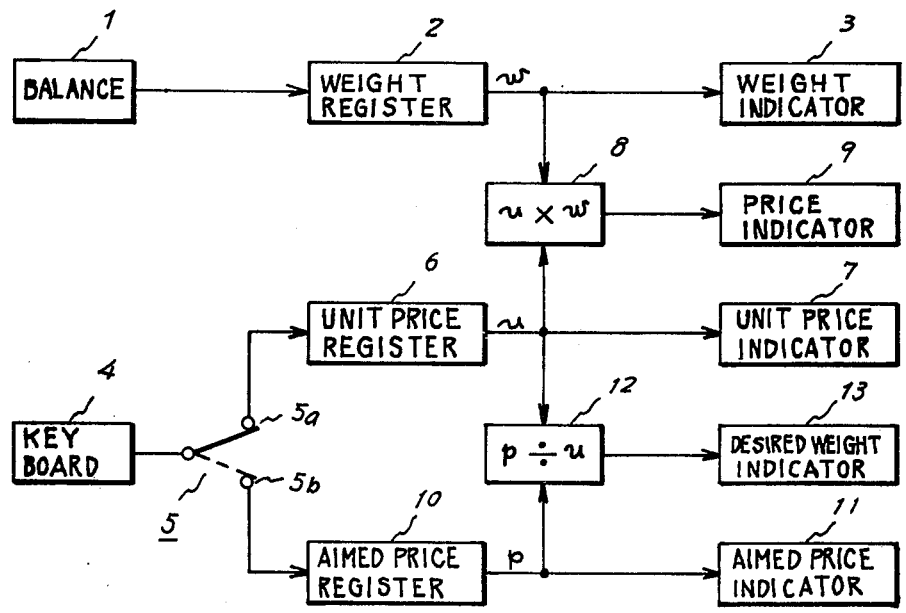

United States Patent
Kawanishi et al.

[11] 4,266,623
[45] May 12, 1981

[54] PRICE CALCULATING BALANCE WITH AIMED PRICE INPUT

[75] Inventors: Shozo Kawanishi, Kobe; Masami Yamanaka, Miki, both of Japan

[73] Assignee: Yamato Scale Company, Limited, Hyogo, Japan

[21] Appl. No.: 110,342

[22] Filed: Jan. 7, 1980

[51] Int. Cl.³ .......................................... G01G 23/22
[52] U.S. Cl. ................................ 177/25; 177/DIG. 3
[58] Field of Search .......................... 177/4, 5, 25–44, 177/DIG. 3, 245; 364/567, 568

[56] References Cited

FOREIGN PATENT DOCUMENTS 2757736  6/1978  Fed. Rep. of Germany .............. 177/25
595618   2/1978  Switzerland ....................... 177/DIG. 3

Primary Examiner—George H. Miller, Jr.
Attorney, Agent, or Firm—Eugene E. Geoffrey, Jr.

[57] ABSTRACT

A price calculating balance which includes in addition to circuitry for storing the measured weight of a product and unit price and multiplying the weight by the unit price, circuitry for storing an aimed or desired price and dividing it by the unit price to determine the weight of the product which would correspond to the aimed price at the stored unit price.

2 Claims, 2 Drawing Figures

PRICE CALCULATING BALANCE WITH AIMED PRICE INPUT

This invention relates to a price calculating balance and especially to a novel price calculating balance which can calculate weight of an article corresponding to an aimed amount of money.

A so-called price calculating balance for presetting a price per unit weight of an article (hereinunder referred to as "unit price") and calculating to indicate the total price through multiplication with measured weight has been known in this field, and is described, for example, in U.S. Pat. No. 3,612,842. Although this price calculating balance is convenient for use when a trade is carried out with specified weight, it will encounter such inconvenience that no desired weight is known when the total price is specified and the corresponding weight is to be weighed out.

Accordingly, an object of this invention is to provide a price calculating balance having the function of immediately calculating and indicating the desired weight upon setting unit price and aimed price.

According to this invention, a price calculating balance is provided with means of encoding and storing a measured value of weight, means of storing a unit price, a multiplier for multiplying the contents of the price storing means and weight storing means and price indicating means for indicating the resultant product, as in the prior art price calculating balance. The price calculating balance in accordance with the invention is further provided with means for storing an aimed price, a divider for dividing the content of the aimed price storing means by the content of the unit price storing means and desired weight indicating means for indicating the result of division.

The invention will now be described in more detail with reference to the accompanying drawings and in conjunction with an embodiment thereof.

IN THE DRAWINGS

Figure 2:
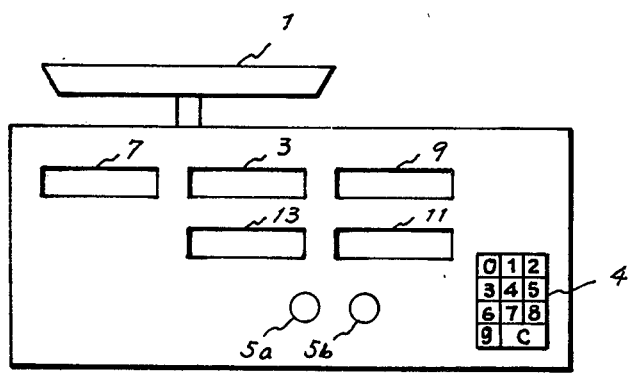

FIG. 1 is a block diagram representing an arithmetic circuit of a price calculating balance embodying this invention; and FIG. 2 is a front view of a price calculating balance including the circuit of FIG. 1, which shows an example of arrangement of its display panel.

Throughout the drawings, corresponding portions are provided with the same reference numerals.

Referring to FIG. 1, block 1 labelled "balance," represents a weight measuring and encoding device which may be a device disclosed, for example, by U.S. Pat. Nos. 3,612,842 or 4,146,873, which serves to sense movement of the weighing cradle in optical fashion and convert it into binary digits representing the weight. The binary digits w representing the weight are stored in a weight register 2, the content of which is converted into a decimal number by a weight indicator 3 and indicated visually in a display window 3 on the front display panel of FIG. 2. Block 4, representing a key board input device, includes an input key board 4 attached to the front display panel as shown in FIG. 2 and an encoder for converting a numerical value input into binary digits, and its output is stored in a unit price register 6 through one contact 5a of a switch 5 and, at the same time, converted into a decimal number by a unit price indicator 7 to be indicated in a display window 7 of FIG. 2. Output u of the unit price register 6 and output w of the weight register 2 are multiplied in a multiplier 8 and the resultant product is converted into a decimal number by a price indicator 9 and displayed in a display window 9 of FIG. 2. Thus, the unit price, total weight and price of an article are displayed respectively in the display windows 7, 3 and 9 of the display panel. The above described apparatus is a known arrangement in the price calculating balance art.

By turning the switch 5, the key board input device 4 is coupled also through another contact 5b to an aimed price register 10. The switch 5 is arranged to be shifted between contacts 5a and 5b by pushing respectively push buttons 5a and 5b on the display panel of FIG. 2. When the push button 5b is pushed to input an aimed price through the key board 4, the aimed value is converted into binary digits and stored in the register 10 and then converted into a decimal number by an aimed price indicator 11 and indicated in a display window 11 of FIG. 2. The output p of the aimed price register 10 is also coupled to a divider 12 with the output u of the unit price register 6. The divider 12 divides the output p by the output u to produce a binary output representing the desired weight which is in turn converted into a decimal number by a desired weight indicator 13 and indicated in a display window 13 of FIG. 2. Accordingly, one may increase or decrease the article on the weighing cradle 1 so that the displayed value in the weight display window 3 coincides with the displayed value in the desired weight display window 13.

As described above, the price calculating balance of this invention displays the desired weight immediately upon setting the unit price and aimed price of article and, therefore, makes trade of the article further convenient.

The above description has been made for illustrative purpose and none of its details confines the invention. Various modifications can be made on the above embodiment within the scope of this invention as defined in the appended claims. For example, the structure of the numerical input device and the arrangement of display devices can be designed arbitrarily by those skilled in the art. It is a matter of course that it is convenient to make adequate indications of units of weight and price and respective contents of display at the respective display windows, though not shown in the drawing.

What is claimed is:

1. A price calculating balance, comprising means for measuring weight and encoding and storing the measured value, means for presetting and storing unit price, a multiplier for multiplying the contents of said unit price storing means and weight storing means and price indicating means for indicating the result of said multiplication, said balance further comprising means for presetting and storing an aimed price, a divider for dividing the content of said aimed price storing means by the content of said unit price storing means, and desired weight indicating means for indicating the result of said division.

2. A price calculating balance according to claim 1 wherein said unit price storing means and aimed price storing means are coupled through a turn-over switch to a common numerical value input device.

* * * * *